(12) United States Patent
Nakamura et al.

(10) Patent No.: US 7,396,400 B2
(45) Date of Patent: Jul. 8, 2008

(54) WATER BASE ERASABLE INK COMPOSITION FOR USE IN MARKING PENS

(75) Inventors: Keiko Nakamura, Osaka (JP); Hidetoshi Fukuo, Osaka (JP); Jiro Nakagawa, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 10/756,348

(22) Filed: Jan. 14, 2004

(65) Prior Publication Data

US 2004/0147632 A1  Jul. 29, 2004

(30) Foreign Application Priority Data

Jan. 14, 2003 (JP) .............................. 2003-005462
Jun. 9, 2003 (JP) .............................. 2003-163302
Aug. 1, 2003 (JP) .............................. 2003-205323

(51) Int. Cl.
C09D 11/02 (2006.01)
(52) U.S. Cl. .................................. 106/31.58; 106/31.86
(58) Field of Classification Search .............. 106/31.58, 106/31.86
See application file for complete search history.

(56) References Cited

U.S. PATENT DOCUMENTS 5,677,363 A * 10/1997 Imagawa .................... 523/161
5,854,320 A * 12/1998 Nakamura et al. ............ 524/48
6,666,913 B2 * 12/2003 Hirano et al. .............. 106/31.9

FOREIGN PATENT DOCUMENTS

JP  10025443 A  *  1/1998

OTHER PUBLICATIONS

English machine translation of JP 10-025443 A.*

* cited by examiner

Primary Examiner—Jerry A. Lorengo
Assistant Examiner—Veronica Faison Gee
(74) Attorney, Agent, or Firm—Wenderoth, Lind & Ponack, L.L.P.

(57) ABSTRACT

A water base erasable ink composition for use in marking pens which comprises 0.05-20% by weight of a colorant and 1-20% by weight of an oily material which is nonvolatile at normal temperatures (25° C.) and is dispersed in water, wherein the oily material has a viscosity of 5-40 mPa·s at 20° C. and is dispersed in water in the form of emulsion, and wherein the colorant is dispersed in the water with the aid of a polyvinyl alcohol resin as a dispersing agent which has a saponification degree of 70-85 mol % and of which aqueous solution of 4% concentration has a viscosity of 2-30 mPa·s at 20° C. in a weight ratio of the resin to the colorant of 0.5 to 5 and in an amount of 1 to 10% by weight based on the ink composition.

8 Claims, No Drawings

WATER BASE ERASABLE INK COMPOSITION FOR USE IN MARKING PENS

FIELD OF THE INVENTION

The invention relates to a water base erasable ink composition for use in marking pens. More particularly, the invention relates to an erasable ink composition which is water base, and in addition, which provides writings or markings on a non-absorptive or impervious writing surface, typically on a white board, which are superior in erasability at an early stage when they have not been dried or they are still wet, as well as after they have been dried, and which leave no stain on the white board after they have been wiped out. As a further aspect, the invention relates to a water base erasable ink composition for use in marking pens which is improved in stability in viscosity when it is left standing.

DESCRIPTION OF THE RELATED ART

A variety of water base ink compositions for use in marking pens which form, on a non-absorptive or impervious writing surface, writings or markings erasable by wiping them lightly with erasers made of soft cloth (white board eraser) are already known.

These known erasable ink compositions usually contain an additive called a separating agent together with water as a solvent, a coloring agent and a film-forming resin so that the writings formed therewith on a writing surface are erasable. For example, a nonvolatile oily material such as an aliphatic carboxylic acid ester that is nonvolatile at normal temperatures is contained in the ink compositions in the form of emulsion so that it functions as a separating agent, as described in JP-1-252681A).

A water base erasable ink composition which contains cyclodextrins or their derivatives as a stabilizing agent for the above-mentioned separating agents is also already known, as described in JP-10-25422A or JP-10-25443A.

However, the writings formed with the known water base erasable ink compositions on white boards are not erased enough when they are wiped with erasers at an early stage while the writings have not been dried completely or they are still wet, and as results, there remains stain on the white board.

SUMMARY OF THE INVENTION

Therefore, it is an object of the invention to provide a water base erasable ink composition for use in marking pens which is improved in erasability even at an early stage while the writings formed therewith have not been dried completely or they are still wet, as well as after the writings have been dried, so that there remains no stain after the writings have been wiped out, and in addition, which is improved in stability in viscosity after standing for long time.

The invention provides a water base erasable ink composition for use in marking pens which comprises, as ingredients, 0.05-20% by weight of a colorant and 1-20% by weight of an oily material which is nonvolatile at normal temperatures (25° C.) and is dispersed in water, wherein the oily material has a viscosity of 5-40 mPa·s at 20° C. and is dispersed in water in the form of emulsion, and wherein the colorant is dispersed in the water with the aid of a polyvinyl alcohol resin as a dispersing agent which has a saponification degree of 70-85 mol % and of which aqueous solution of 4% concentration has a viscosity of 2-30 mPa·s at 20° C. in a weight ratio of the resin to the colorant of 0.5 to 5 and in an amount of 1 to 10% by weight based on the ink composition.

The invention also provides a water base erasable ink composition for use in marking pens which further comprises a thixotropic agent in addition to the above-mentioned ingredients.

DESCRIPTION OF THE PREFERRED EMBODIMENTS

The ink composition of the invention is suitable for use in writing instruments called marking pens or felt pens which have within a hollow holder an ink reservoir composed of felt or bundle of fibers impregnated with ink, and a pen tip which is composed of plastics, bundle of fibers or sintered body and is fitted at the end of the holder to which the ink is supplied from the ink reservoir by making use of capillary phenomenon, thereby permitting to write. This type of marking pen is hereunder referred to as the inside wick marking pen. However, the ink composition of the invention is also suitable for use in marking pens which store ink within a hollow holder itself.

The ink composition for use in a marking pen of the invention uses water as a solvent. The ink composition contains water usually in an amount of 50-90% by weight, preferably 60-80% by weight.

The ink composition contains a colorant, usually a pigment. The pigment may be either organic or inorganic. The pigment usable includes, for example, carbon black, phthalocyanines such as copper phthalocyanine blue or brominated phthalocyanine, threne pigments, azo pigments, quinacridones, anthraquinones, dioxazines, indigos, thioindigos, perynones, perylenes, indolenones and azo-azomethines, although the pigment usable is not limited to those exemplified. Fluorescent pigments may also be used. As explained in detail hereinafter, when the ink composition of the invention contains a thixotropic agent, the coloring agent usable further includes colored resin particles or aluminum powder pigment.

Among the various carbon blacks, acidic carbon black is preferred because the use of such an acidic carbon black provides a water base erasable ink composition which is in particular superior in erasability. The acidic carbon black is so called since the particles thereof have hydroxyl groups or carboxyl groups on the surface and the pH of aqueous dispersion of the particles is in the acidic region. The acidic carbon black is thus hydrophilic.

Accordingly, the water base ink composition using such an acidic carbon black as a colorant forms writings or coatings on a white board in which the hydrophilic component composed of a solvent (water) and the acidic carbon black does not get mixed with a hydrophobic separating agent so that a layer of the separating agent is formed on the surface of the white board and a hydrophilic layer is separately formed on the layer of the separating agent. As results, when the writing is wiped out with an eraser, there remains no stain on the surface of the white board since the layer of the separating agent contains no hydrophilic acidic carbon black, if there remains a portion of the separating agent.

The ink composition contains a colorant usually in an amount of 0.05-20% by weight. When the amount of colorant is less than 0.05% by weight based on the ink composition, the writing is lacking in density and the ink composition is not suitable for practical use. On the other hand, when the amount of colorant is more than 20% by weight based on the ink composition, the darkness of writing does not increase accordingly, and in addition, the ink composition has an excessively high viscosity so that it is not erased readily as well as it writes bad. Moreover, when a marking pen is left standing with a cap removed from the pen tip, the ink composition dries on the pen tip so that it is readily blocked. The ink composition contains a colorant preferably in an amount of 0.1-10% by weight, and most preferably in an amount of 0.5-7% by weight.

The colorant is dispersed in water with the aid of water-soluble polyvinyl alcohol resin as a dispersing agent to form a water base dispersion, and according to the invention, the colorant is incorporated in the ink composition as such. The above-mentioned water-soluble polyvinyl alcohol resin is such that it has a saponification degree of 70-85 mol % and it provides an aqueous solution having 4% by weight concentration which has a viscosity of 2-30 mPa·s at 20° C.

When the saponification degree of polyvinyl alcohol resin is outside the above range, it is difficult to obtain a stable water base dispersion of colorant. When the viscosity of aqueous solution having 4% by weight concentration is more than 30 mPa·s at 20° C., the colorant is well dispersed in the ink composition, but the resulting ink composition writes bad. On the other hand, when the viscosity of aqueous solution having 4% by weight concentration is less than 2 mPa·s at 20° C., the colorant is not dispersed stably but also the resulting ink composition provides writings which are not readily erasable.

When the water base dispersion of colorant is prepared, the polyvinyl alcohol resin is used as a dispersing agent in a weight ratio of the resin to the colorant of 0.5 to 5, preferably in a weight ratio of 1 to 3, and in an amount of 1-10% by weight, preferably in an amount of 2-8% by weight based on the ink composition. In the preparation of the water base dispersion of colorant, the polyvinyl alcohol resin may be used from the first in a weight ratio of the resin to the colorant of 0.5 to 5. Alternatively, the polyvinyl alcohol resin may be used at first in a weight ratio of the resin to the colorant of less than 0.5 to disperse the colorant in water to prepare a preliminary water base dispersion, and then the polyvinyl alcohol resin is added to the preliminary water base dispersion so that the resulting dispersion contains the resin in a weight ratio to the colorant of 0.5 to 5. In sum, it is enough that the water base dispersion of colorant contains the polyvinyl alcohol resin in a resin/colorant weight ratio of 0.5 to 5 when it is used to prepare a water base ink composition of the invention.

When the resin/colorant weight ratio of the water base dispersion of colorant is less than 0.5, the resulting ink composition is inferior in viscosity stability and becomes viscous when it is left standing. When the ink composition becomes viscous in this way, it writes bad and it provides writings inferior in erasability. The use of polyvinyl alcohol resin in a resin/colorant weight ratio of not less than 0.5 provides an ink composition which is improved in viscosity stability if it is left standing.

However, when the water base dispersion of colorant contains the resin in a resin/colorant weight ratio of more than 5, or when the ink composition contains the resin in an amount of more than 10% by weight, the resulting ink composition has an excessively high viscosity so that it writes bad and provides writings inferior in erasability. On the other hand, when the amount of polyvinyl alcohol resin used is too small, the colorant is not well dispersed in the ink composition but also it forms writings inferior in erasability. In particular, there remains color stain on a white board when the writing is wiped out while it is not dried enough.

When the water base dispersion of colorant is prepared, an aliphatic lower alcohol of number of carbon atoms of 2-4 may be used as a wetting agent for the colorant. The wetting agent usable includes, for example, ethanol, propanol or butanol, and in particular, ethanol or isopropanol is preferred. The wetting agent is used in such an amount that it does not destroy an emulsion of an oily material, as mentioned later. Accordingly, the wetting agent is used in an amount of 0.1-2 parts by weight, preferably in an amount of 0.2-1 parts by weight, in relation to one part by weight of colorant.

The method of preparation of the water base dispersion of colorant is not specifically limited, but, for example, water is placed in a vessel together with polyvinyl alcohol resin as a dispersing agent and a wetting agent such as isopropanol, for instance, and then further a colorant, and if necessary a surfactant, and is stirred to form a uniform mixture. The mixture is then subjected to treatment by means of, for example, a beads mill, to disperse the colorant as finely divided particles in water to form a water base dispersion of colorant.

As explained in detail hereinafter, when the ink composition of the invention contain a thixotropic agent, the coloring agent may be dispersed in water by using the water-soluble polyvinyl alcohol resin as a dispersing agent, or the coloring agent may be dispersed in water by using styrene-acrylic acid copolymer or styrene-maleic acid copolymer as a dispersing agent to prepare a water base dispersion of colorant. Furthermore, when the water base dispersion of colorant for use in an ink composition that contains a thixotropic agent is prepared, it is preferred that the polyvinyl alcohol resin is used as a dispersing agent in a weight ratio of the resin to the colorant in the range of 0.5-3.

According to the invention, the water base erasable ink composition contains an oily material as a separating agent which is nonvolatile at normal temperatures (25° C.) and has a viscosity of 5-40 mPa·s at 20° C. in the form of emulsion prepared by using a surfactant as an emusifier.

The oily material preferably used includes, for example, aliphatic carboxylic acid esters, higher hydrocarbon or higher alcohols. In the invention, the higher hydrocarbon or the higher alcohol is such that it contains 6 to 30 carbon atoms, and the higher fatty acid is also such that it contain 6 to 30 carbon atoms. The aliphatic carboxylic acid ester includes monobasic acid esters, dibasic acid diesters, mono or diesters of divalent alcohols, mono-, di- or triesters of trivalent alcohols, and polyglycerine esters. In particular, the aliphatic carboxylic acid esters are preferably used as a separating agent.

The aliphatic carboxylic acid ester, in particular, a higher fatty acid alkyl ester or a higher fatty acid glyceride which is nonvolatile at normal temperatures (25° C.) and has a viscosity of 5-40 mPa·s at 20° C. may be exemplified by, for example, cetyl isooctanoate (having a viscosity of 13.1 mPa·s at 20° C.), isopropyl myristate (having a viscosity of 5.4 mPa·s at 20° C.), isopropyl palmitate (having a viscosity of 7.8 mPa·s at 20° C.), isooctyl stearate (having a viscosity of 15.0 mPa·s at 20° C.), 2-hexyldecyl isostearate (having a viscosity of 36.8 mPa·s at 20° C.), diethyl cebacate (having a viscosity of 6.1 mPa·s at 20° C.), or glycerol tri(caprylate/caprate) (having a viscosity of 28.3 mPa·s at 20° C.). Among these are particularly preferred isooctyl stearate, cetyl isooctanoate or glycerol tri-(capryrate/caprinate).

The higher hydrocarbon which is nonvolatile at normal temperatures (25° C.) and has a viscosity of 5-40 mPa·s at 20° C. includes, for example, liquid paraffin (having a viscosity of 15.0 mPa·s).

The higher alcohol which is nonvolatile at normal temperatures (25° C.) and has a viscosity of 5-40 mPa·s at 20° C. includes, for example, hexyl alcohol (having a viscosity of 5.2 mPa·s), octyl alcohol (having a viscosity of 8.9 mPa·s) or dodecyl alcohol (having a viscosity of 18.8 mPa·s).

The oily material may be used singly or in a mixture of two or more. Accordingly, if an oily material has by itself a viscosity of more than 40 mPa·s at 20° C. or if an oily material has by itself a viscosity of less than 5 mPa·s at 20° C., it can be used as a mixture of other oily materials if the mixture has a viscosity in the range of 5-40 mPa·s at 20° C. For example, diisopropyl adipate has by itself has a viscosity 4.2 mPa·s at 20° C., but if a mixture with other oily materials has a viscosity in the range of 5-40 mPa·s at 20° C., diisopropyl adipate may be used as such a mixture.

The O/W emulsion of the oily material is prepared preferably by using a nonionic surfactant as an emulsifier. The nonionic surfactant is used in an amount of 1-20% by weight, preferably in an amount of 2-15% by weight based on the emulsion prepared. When a nonionic surfactant is used in an amount of more than 20% by weight based on the emulsion prepared, the resulting ink composition forms sticky writings which are inferior in erasability. However, when a nonionic surfactant is used in an amount of less than 1% by weight based on the emulsion prepared, the resulting emulsion contains large particles and is unstable, and after all, such an emulsion makes the resulting ink composition also unstable.

The nonionic surfactant includes, for example, polyoxyethylene alkyl ether, polyoxyethylene polyoxypropylene alkyl ether, polyoxyethylene sorbitan fatty acid ester, sorbitan fatty acid ester, polyoxyethylene glycerine fatty acid ester, polyglycerine fatty acid ester, polyoxyethylene sorbit fatty acid ester, polyoxyethylene castor oil, polyoxyethylene hardened oil, polyethylene glycol fatty acid ester, polyoxyethylene alkyl phenyl ether, polyoxyethylene lanolin, and polyoxyethylene lanolin alcohol. Among these exemplified are in particular preferred polyoxyethylene alkyl ether, polyoxyethylene polyoxypropylene alkyl ether, polyoxyethylene sorbitan fatty acid ester or sorbitan fatty acid ester.

Although the reason is not yet clear, the erasability of the ink composition while it has not been dried enough is remarkably improved when an emulsion of the oily material prepared by using a nonionic surfactant is used as an emulsifier in this way. The erasability of the ink composition after it has been dried is also remarkably improved regardless of the material of which the white board is made. In particular, the ink composition forms writings readily erasable after they have been dried on a white board having a resin surface.

Such an O/W emulsion may be prepared by a commonly known emulsification method. However, such an O/W emulsion may be available in the market. If necessary, an emulsion of two or more of aliphatic carboxylic acid esters, higher hydrocarbons or higher alcohols may also be incorporated in the ink composition.

The ink composition of the invention contains such an oily material which is nonvolatile at normal temperatures (25° C.) as mentioned above as a separating agent in an amount of 1-20% by weight, preferably in an amount of 5-15% by weight, and thus it forms writings on a white board which can be readily erased by wiping without leaving color stain even if it has not been dried enough.

However, when the ink composition contains the oily material in an amount of less than 1% by weight, the ink composition provides only writing insufficient in erasability, and on the hand, when the ink composition contains the oily material in an amount of more than 20% by weight, the writing formed is inferior in erasability. In particular, when a writing is wiped while it has not been dried enough or it is still wet, it leaves stain on the white board.

The ink composition of the invention may further contain cyclodextrins or their derivatives as a stabilizing agent for the O/W emulsion of the oily material mentioned above. In the specification, the cyclodextrins or their derivatives are referred hereunder simply to "the cyclodextrin".

The cyclodextrin is a cyclic sugar oligomer composed of six to ten D-Glucopyranoside groups bonded together through $\alpha$-(1,4) glucosidic linkage. Among the cyclodextrins are well known $\alpha$-, $\beta$- or $\gamma$-cyclodextrin which has a polymerization degree of 6, 7 or 8, respectively.

In addition to the above mentioned cyclodextrins, their derivatives may also be used. The preferred derivatives include, for example, methyl derivatives such as 2,6-dimethyl-$\beta$-cyclodextrin, 2,3,6-trimethyl-$\beta$-cyclodextrin or partially methylated $\beta$-cyclodextrin, and besides, maltosylcyclodextrin or glucosylcyclodextrin. These cyclodextrin derivatives are all water soluble, to greater or lesser degrees.

The cyclodextrin may be contained in the ink composition in an amount of 1-10% by weight based on the ink composition. When the content of the cyclodextrin is less than 1% by weight, the resultant ink composition is not improved in the stability of the emulsion of the oily material. When the content is more than 10% by weight, the resultant ink composition has an excessively high viscosity so that it writes bad, but also it has an excessively large adhesion to a writing surface so that it is reduced in erasability. The content of the cyclodextrin is preferably in the range of 1.5-5% by weight.

The ink composition of the invention may contain a nonionic surfactant as a separating assistant, if necessary. The nonionic surfactant usable includes, for example, polyoxyethylene ethers (e.g., polyoxyethylene alkyl ethers or polyoxyethylene alkyl phenyl ethers), polyhydric alcohol fatty acid esters, or polyhydric alcohol fatty acid esters polyoxyethylene ethers. Such a nonionic surfactant is used in an amount of 0.1-5% by weight based on the ink composition, if necessary, although the amount is not specifically limited.

The ink composition of the invention may further contain anionic surfactants such as sodium dioctylsulfosuccinate as well as silicone surfactants, fluorine-containing surfactants or acetylene surfactants, if necessary, as a leveling agent. Such a surfactant may be used in the range of 0.05-5% by weight based on the ink composition, if necessary, although the amount is not specifically limited.

The ink composition of the invention is not specifically limited in the methods in which it is prepared. However, it may be prepared, for example, as follows. As mentioned hereinbefore, first, a colorant, polyvinyl alcohol resin as a dispersing agent, a wetting agent for the colorant to water such as isopropanol, and if necessary a surfactant, are placed in a vessel together with water, and are mixed to form a uniform mixture. The mixture is then subjected to treatment by means of a beads mill or a ball mill to disperse the colorant as finely divided particles in water to form a dispersion. When necessary, water or an aqueous solution of dispersing agent is added to the dispersion to adjust the amount of the colorant in the dispersion so that a water base dispersion containing the predetermined amount of colorant therein. Also as mentioned hereinbefore, an O/W emulsion of oily material is prepared as a separating agent.

Then, water and the water base dispersion of colorant prepared as above, and if necessary, a surfactant, are added to the vessel, and the resulting mixture is stirred, followed by adding the emulsion of oily material and, if necessary an antiseptic or an antifungal is added to the mixture and mixing and stirring, thereby to provide the ink composition of the invention.

The ink composition containing a thixotropic agent is also prepared in the same manner. After preparing a water base dispersion of colorant, water and the water base dispersion of colorant, and if necessary a surfactant, are added to the vessel, and the resulting mixture is stirred, followed by adding the emulsion of oily material and then a thixotropic agent, and if necessary an antiseptic or an antifungal to the mixture, and mixing and stirring the resulting mixture, thereby providing the ink composition of the invention.

As the wetting agent for colorant to water, lower aliphatic alcohols such as ethanol, propanol or butanol is usually preferred, and these lower aliphatic alcohols are also useful to enhance drying of the ink composition after writing. Accordingly, the lower aliphatic alcohol may be incorporated in the ink composition of the invention in total in an amount of not more than 15% by weight, preferably in an amount of 1-10% by weight, based on the ink composition.

The water base erasable ink composition of the invention contains as a separating agent an oily material which is nonvolatile at normal temperatures and is dispersed in water in the form of O/W emulsion, while a colorant is dispersed in water using polyvinyl alcohol resin having a predetermined saponification degree and viscosity as a dispersing agent in a specific ratio of the resin to the colorant of 0.5 to 5 and in an amount of 1-10% by weight based on the ink composition.

Accordingly, in such a water base erasable ink composition, the colorant is dispersed stably with the aid of excellent protective colloid effect of polyvinyl alcohol resin, and besides, when writings are formed on a white board, the polyvinyl alcohol resin forms film without getting mixed with the oily material which is nonvolatile at normal temperatures on the white board, thereby protecting the colorant and forming writings on the white board.

As results, the water base erasable ink composition of the invention forms such a writing on a white board in which the oily material intervenes among the white board and the writing at an early stage when the writing has not been dried enough on the white board, so that the writing is erased with no stain on the white board when it is wiped. On the other hand, after the writing has been dried, the writing is wholly made of film or coating of the polyvinyl alcohol resin so that it is readily separated as a whole or erased from the surface of the white board when it is wiped. Hence the water base erasable ink composition is also superior in erasability when it has been dried. Furthermore, the water base erasable ink composition is superior in stability of viscosity as well when it is left standing.

As a further aspect of the invention, the ink composition may include a thixotropic agent so that it has a viscosity of not less than 45 mPa·s under a stress of 0.01 Pa and a viscosity of not more than 12 mPa·s under a stress of 10 Pa at a temperature 20° C.

The preferred thixotropic agent is usually a water-soluble resin, and includes, for example, polyacrylic acid, polyacrylic acid alkali metal salts such as lithium salt, sodium salt or potassium salt, polyacrylic acid organic amine salts such as ammonium salt, triethylamine salt or triethanolamine salt, styrene-acrylic acid copolymer, styrene-maleic acid copolymer, carboxymethylcellulose, poly(N-vinyl acetamide), polyols and polyethers, in particular, a variety of modified polyols and polyethers. Among these are particularly preferred polyacrylic acid or polyacrylic acid alkali metal salts.

The thixotropic agent is used in the ink composition so that the resulting ink composition has a viscosity in the range as mentioned above. Accordingly, all the thixotropic agents are not used in the same amount. However, in the case of a preferred thixotropic agent, polyacrylic acid, for example, it is usually in an amount of 0.01-3% by weight, preferably in an amount of 0.5-2% by weight based on the ink composition.

The water base erasable ink composition for use in marking pens containing a thixotropic agent has a viscosity of not less than 45 mPa·s under a stress of 0.01 Pa and a viscosity of not more than 12 mPa·s under a stress of 10 Pa at a temperature 20° C. according to the invention. When the ink composition has a viscosity of less than 45 mPa·s under a stress of 0.01 Pa at a temperature of 20° C., the coloring agent used in a marking pen sediments in the inside wick as time passes, and as results, the ink composition provides writings that are dark or pale depending on if the marking pen has been left standing with the pen tip downward or upward. On the other hand, when the ink composition has a viscosity of more than 12 mPa·s under a stress of 10 Pa at a temperature of 20° C., it does not flow smoothly out of the pen tip made of bundle of threads to provide writings that are faint and patchy, and in addition, that are not readily erased.

The viscosity of an ink composition for use in marking pens has been usually measured by using a rotational viscometer. However, the viscosity of the ink composition that prevents sedimentation of pigment in the inside wick or color separation in writings cannot be determined by using a rotational viscometer. The viscosity of the ink composition of the invention is therefore measured in terms of stress viscosity by using a rheometer.

As mentioned above, when the ink composition has a viscosity of not less than 45 mPa·s under a stress of 0.01 Pa at a temperature of 20° C., the pigment does not sediment in the ink composition and the ink composition provide writings in which no color separation takes place. The stress of 0.01 Pa is very small, and according to the invention, it is important that the ink composition has a viscosity of not les than 45 mPa·s at a temperature of 20° C. in order to prevent the sedimentation of pigment in the ink composition.

The ink composition of the invention is particularly useful when it is used in the inside wick marking pens in which the inside wick is composed of bundle of threads having a density of 0.150-0.260 g/cm$^3$ since the ink composition does not sediments in the inside wick and provides writings in which color separation does not occur, thus providing a high-performance marking pen.

EXAMPLES

The invention will be explained in more detail with reference to examples, however, the invention is not limited to the examples. In the examples and reference examples, the amounts of the components of the ink composition are expressed in percent by weight and the remainder is water.

Example 1

| | | |
|---|---|---|
| Pigment dispersion | Black pigment dispersion[1] | 40.0 |
| Separating agent | Emulsion of cetyl isooctanoate (containing 50% of oily material) | 20.0 |
| Stabilizing agent | α-cyclodextrin | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 2

| | | |
|---|---|---|
| Pigment dispersion | Red pigment dispersion[2] | 40.0 |
| Separating agent | Emulsion of glyceryl tri(caprilate/caprate) (containing 50% of oily material) | 20.0 |
| Stabilizing agent | Mixture of α-, β- and γ-cyclodextrin | 2.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Example 3

| | | |
|---|---|---|
| Pigment dispersion | Blue pigment dispersion[3] | 40.0 |
| Separating agent | Emulsion of cetyl isooctanoate (containing 50% of oily material) | 20.0 |
| Stabilizing agent | Mixture of α-, β- and γ-cyclodextrin | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 4

| | | |
|---|---|---|
| Pigment dispersion | Green pigment dispersion[4] | 40.0 |
| Separating agent | Emulsion of glyceryl tri(caprilate/caprate) (containing 50% of oily material) | 20.0 |
| Stabilizing agent | α-cyclodextrin | 2.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Example 5

| | | |
|---|---|---|
| Pigment dispersion | Red pigment dispersion[2] | 40.0 |
| Separating agent | Emulsion of glyceryl tri(caprilate/caprate) (containing 50% of oily material) | 20.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 1

| | | |
|---|---|---|
| Pigment dispersion | Black pigment dispersion[5] | 40.0 |
| Separating agent | Emulsion of cetyl isooctanoate (containing 50% of oily material) | 20.0 |
| Stabilizing agent | α-cyclodextrin | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 2

| | | |
|---|---|---|
| Pigment dispersion | Red pigment dispersion[6] | 40.0 |
| Separating agent | Emulsion of glyceryl tri(caprilate/caprate) (containing 50% of oily material) | 20.0 |
| Stabilizing agent | Mixture of α-, β- and γ-cyclodextrin | 2.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 3

| | | |
|---|---|---|
| Pigment dispersion | Blue pigment dispersion[7] | 40.0 |
| Separating agent | Emulsion of cetyl isooctanoate (containing 50% of oily material) | 20.0 |
| Stabilizing agent | α-cyclodextrin | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 4

| | | |
|---|---|---|
| Pigment dispersion | Green pigment dispersion[8] | 40.0 |
| Separating agent | Emulsion of glyceryl tri(caprilate/caprate) (containing 50% of oily material) | 20.0 |
| Stabilizing agent | Mixture of α-, β- and γ-cyclodextrin | 2.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 5

| Pigment dispersion | Black pigment dispersion[7] | 40.0 |
|---|---|---|
| Separating agent | Emulsion of trimethylol propane tri(2-ethylhexanoate) (having a viscosity of 64.3 mPa·s)(containing 50% of oily material) | 20.0 |
| Stabilizing agent | α-cyclodextrin | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 6

| Pigment dispersion | Green pigment dispersion[8] | 40.0 |
|---|---|---|
| Separating agent | Emulsion of white mineral oil (having a viscosity of 64.3 mPa·s) (containing 50% of oily material) | 20.0 |
| Surfactant | Sodium dioctylsulfosuccinate | 1.5 |
| | Fluorine-containing surfactant (Surflon S141 available from Seimi Chemical K.K.) | 0.2 |
| Antiseptic | Proxel XL-2 (available from Avecia K.K.) | 0.5 |

Note 1) Water Base Pigment Dispersion Used:

1) Carbon black (Special Black 100 available from Degussa) and aqueous solution (of solid content of 15% by weight) of polyvinyl alcohol resin (Kuraray Poval PVA-403 having a saponification degree of 78.5-81.5 mol % and a viscosity of 2.8-3.3 mPa·s at 20° C. as measured with respect to 4% concentration aqueous solution of the resin, available from Kuraray K.K.) were placed in a vessel in a weight ratio of 1:2, and then isopropanol (wetting agent) was added in an amount of 0.3 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, the same aqueous solution of polyvinyl alcohol resin as the above was added to the dispersion so that the resulting water base black pigment dispersion contained the pigment in an amount of 8% by weight and the polyvinyl alcohol resin in an amount of 12% by weight.

2) Red pigment (Novoperm Red GLF available from Clariant Japan K.K.) and aqueous solution (of solid content of 15% by weight) of polyvinyl alcohol resin (Kuraray Poval L-98-78 having a saponification degree of 76.5-79.0 mol % and a viscosity of 6.0-6.7 mPa·s at 20° as measured with respect to 4% concentration aqueous solution of the resin, available from Kuraray K.K.) were placed in a vessel in a weight ratio of 1:2, and then ethanol (wetting agent) was added in an amount of 0.2 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, the same aqueous solution of polyvinyl alcohol resin as the above was added to the dispersion so that the resulting water base red pigment dispersion contained the pigment in an amount of 8% by weight and the polyvinyl alcohol resin in an amount of 12% by weight.

3) Blue pigment (Chromophthal Blue A3RJ available from Chiba Specialty Chemicals K.K.) and aqueous solution (of solid content of 16% by weight) of polyvinyl alcohol resin (Kuraray Poval PVA-405 having a saponification degree of 80.0-83.0 mol % and a viscosity of 4.5-5.2 mPa·s at 20° C. as measured with respect to 4% concentration aqueous solution of the resin, available from Kuraray K.K.) were placed in a vessel in a weight ratio of 3:20, and then n-propanol (wetting agent) was added in an amount of 0.4 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, the same aqueous solution of polyvinyl alcohol resin as the above was added to the dispersion so that the resulting water base blue pigment dispersion contained the pigment in an amount of 8% by weight and the polyvinyl alcohol resin in an amount of 10% by weight.

4) Green pigment (Lyonol Green 6YK available from Toyo Ink Manufacturing K.K.) and aqueous solution (of solid content of 15% by weight) of polyvinyl alcohol resin (Gosenol KM-11 having a saponification degree of 76.7-79.3 mol % and a viscosity of 11.7-14.3 mPa·s at 20° C. as measured with respect to 4% concentration aqueous solution of the resin, available from Nippon Gosei Kagaku Kogyo K.K.) were placed in a vessel in a weight ratio of 3:10, and then isopropanol (wetting agent) was added in an amount of 0.3 parts by weight in relation to one part by weight of the pigment. The resulting mixture was stirred and then it was subjected to treatment with a beads mill to disperse the pigment in the water as finely divided particles of average particle size of 0.3 μm to provide a dispersion. Then, the same aqueous solution of polyvinyl alcohol resin as the above was added to the dispersion so that the resulting water base green pigment dispersion contained the pigment in an amount of 7% by weight and the polyvinyl alcohol resin in an amount of 9% by weight.

5) Carbon black (Printex G available from Degussa) and aqueous solution (of solid content of 15% by weight) of polyvinyl alcohol resin (Kuraray Poval PVA-210 having a saponification degree of 87.0-89.0 mol % and a viscosity of 8.0-10.0 mPa·s at 20° C. as measured with respect to 4% concentration aqueous solution of the resin, available from Kuraray K.K.) were placed in a vessel in a weight ratio of 1:2, and then isopropanol (wetting agent) was added in an amount of 0.3 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, the same aqueous solution of polyvinyl alcohol resin as the above was added to the dispersion so that the resulting water base black pigment dispersion contained the pigment in an amount of 8% by weight and the polyvinyl alcohol resin in an amount of 10 by weight.

6) Red pigment (Novoperm Red GLF available from Clariant Japan K.K.) and aqueous solution (of solid content of 15% by weight) of polyvinyl alcohol resin (Kuraray Poval PVA-403 having a saponification degree of 78.5-81.5 mol % and a viscosity of 2.8-3.3 mPa·s at 20° C. as measured with respect to 4% concentration aqueous solution of the resin, available from Kuraray K.K.) were placed in a vessel in a weight ratio of 3:10, and then ethanol (wetting agent) was added in an amount of 0.3 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, water was added to the dispersion so that the resulting water base red pigment dispersion contained the pigment in an amount of 10% by weight and the polyvinyl alcohol resin in an amount of 5 by weight.

7) Blue pigment (Monolight Blue 3R available from Avecia K.K.) and aqueous solution (of solid content of 15% by weight) of polyvinyl alcohol resin (Gosenol KM-11 having a saponification degree of 76.7-79.3 mol % and a viscosity of 11.7-14.3 mPa·s at 20° C. as measured with respect to 4% concentration aqueous solution of the resin, available from Nippon Gosei Kagaku Kogyo K.K.) were placed in a vessel in a weight ratio of 3:10, and then propylene glycol (wetting agent) was added in an amount of 0.4 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, water was added to the dispersion so that the resulting water base red pigment dispersion contained the pigment in an amount of 8% by weight and the polyvinyl alcohol resin in an amount of 10 by weight.

8) Green pigment ((Heliogen Green L9361 available from BASF Japan K.K.) and aqueous solution (of solid content of 15% by weight) of polyvinyl alcohol resin (Kuraray Poval PVA-210 having a saponification degree of 87.0-89.0 mol % and a viscosity of 8.0-10.0 mPa·s at 20° C. as measured with respect to 4% concentration aqueous solution of the resin, available from Kuraray K.K.) were placed in a vessel in a weight ratio of 3:10, and then propylene glycol (wetting agent) was added in an amount of 0.4 parts by weight in relation to one part by weight of the pigment. The resulting mixture was stirred and then it was subjected to treatment with a beads mill to disperse the pigment in the water as finely divided particles of average particle size of 0.3 μm to provide a dispersion. Then, water was added to the dispersion so that the resulting water base red pigment dispersion contained the pigment in an amount of 9% by weight and the polyvinyl alcohol resin in an amount of 4.5 by weight.

Notes 2) The Nonionic Surfactant Used for the Preparation of Emulsion of an Oily Material:

For the preparation of emulsion of cety isooctanoate, a mixture of polyoxyethylene (20) polyoxypropylene (4) cetyl ether and polyoxyethylene (5) oleyl ether was used. For the preparation of emulsion of glyceryl tri(caprylate/caprate), a mixture of monooleic acid polyoxyethylene (20) sorbitan and monostearic acid sorbitan. For the preparation of emulsion of trimethylolpropane tri(2-ethylhexanoate), a mixture of polyoxyethylene (20) oleyl ether and polyoxyethylene (2) oleyl ether. For the preparation of emulsion of white mineral oil, a mixture of monopalmitic acid polyoxyethylene (20) sorbitan and monolauric acid sorbitan. The numerals in the above parentheses shows the number of mols of ethylene oxide or propylene oxide added.

The ink compositions prepared above were each charged in an inside wick marking pen. A predetermined mark was drawn on a white board having an enamel surface under the conditions of temperature of 20° C. and a relative humidity of 65%. While the marking was not dried enough (that is, while the marking was still wet, after 5 seconds later from marking) or after the marking had been dried (i.e., one month later from marking), the marking was wiped under a load of 200 g to evaluate the erasability of the marking, as follows. "A" means that the marking was erased until it was wiped five times; "B" means that the marking was erased until it was wiped ten times; "C" means that the marking was erased until it was wiped 20 times; and "D" means that the marking was not erased after it was wiped more than 20 times.

It was also visually checked if there remained stain on the white board if the marking was wiped while the marking had not been dried or the marking was still wet. "A" means that there remained no stain or almost no stain on the white board; "B" means that there remained some stain on the white board; and "C" means that there remained stain remarkably on the white board and it seemed that the marking was not erased.

The stability of viscosity of the ink composition was evaluated by using an ELD viscometer at a number of turns at which the viscosity was measured immediately after the ink composition was prepared and after it was left standing at 50° C. for one month. "A" means that the difference in the viscosity was within ±2 mPa·s; "B" means that the difference in the viscosity was more than ±2 mPa·s and within ±5 mPa·s; "C" means that the difference in the viscosity was more than ±5 mPa·s and within ±10 mPa·s; and "D" means that he difference in the viscosity was more than ±10 mPa·s. The results are shown in Table 1.

TABLE 1

| | Examples | | | | | Reference Examples | | | | | |
|---|---|---|---|---|---|---|---|---|---|---|---|
| | 1 | 2 | 3 | 4 | 5 | 1 | 2 | 3 | 4 | 5 | 6 |
| Properties of Ink Composition | | | | | | | | | | | |
| Erasability while wet | B | B | B | B | B | C | B | C | D | C | D |
| Stain on white board while wet | A | A | A | A | B | C | C | D | D | C | D |
| Erasability when dried | A | A | A | A | A | A | B | A | B | B | C |
| Viscosity stability | A | A | A | A | A | A | A | A | D | B | D |

As clearly shown in Table 1, the ink compositions of Examples 1-5 according to the invention provide writings which are superior in erasability if they have not been dried enough or if they are still wet, as well as after they have been dried enough, and in addition, there remains no stain after the writings after they have been wiped out. The ink composition of the invention is superior also in viscosity stability when it has been left standing.

In contrast to the ink compositions of the invention as above mentioned, the ink composition of Reference Example 1 contains a pigment dispersion that was prepared using a polyvinyl alcohol resin that had a saponification degree of more than 85 mol % so that the ink composition provides only writings which are inferior in erasability when they have not been dried enough, and leave stain after they have been wiped out and erased on a white board. The ink composition of Reference Example 2 contains a pigment dispersion that was prepared using a polyvinyl alcohol resin in a resin/pigment weight ratio of 0.5 so that the ink composition is unstable in viscosity when it is left standing. The ink composition also leaves stain on a white board when it has not been dried enough.

The ink composition of Reference Example 3 contains a pigment dispersion that was prepared using propylene glycol as a wetting agent so that the ink composition provides only writings which are inferior in erasability when they have not been dried enough, and which leave stain after they have been wiped out and erased on a white board.

The ink composition of Reference Example 4 contains a pigment dispersion that was prepared using a polyvinyl alcohol resin having a saponification degree of more than 85 mol % in a resin/pigment weight ratio of 0.5 and propylene glycol as a wetting agent so that the ink composition provides only writings which are inferior in erasability when they have not been dried enough, and which leave stain after they have been wiped out and erased on a white board. The ink composition is also inferior in stability of viscosity when it is left standing.

The ink composition of Reference Example 5 contains an oily material which has not a viscosity requisite to the invention so that the ink composition provides only writings which are inferior in erasability when they have not been dried and which leave stain after they have been wiped and erased on a white board. The ink composition of Reference Example 6 contains a pigment dispersion that was prepared using propylene glycol as a wetting agent and an oily material which had not a viscosity requisite to the invention so that the ink composition provides only writings which are inferior in erasability when they have not been dried and which leave stain after they have been wiped out and erased on a white board. The ink composition is also inferior in stability of viscosity when it is left standing.

Example 6

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Ammonium polyacrylate | 1.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 7

| | | |
|---|---|---|
| Pigment dispersion | Red pigment dispersion[2] | 35.0 |
| Separating agent | Emulsion of cetyl isooctanoate (containing 50% of oily material) | 20.0 |
| Thixotropic agent | Ammonium polyacrylate | 1.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 8

| | | |
|---|---|---|
| Pigment dispersion | Black pigment dispersion[1] | 35.0 |
| Separating agent | Emulsion of glyceryl tri(caprilate/caprate) (containing 50% of oily material) | 20.0 |
| Thixotropic agent | Ammonium polyacrylate | 1.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 9

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Urethane-modified polyol | 2.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 10

| | | |
|---|---|---|
| Pigment dispersion | Black pigment dispersion[1] | 35.0 |
| Separating agent | Emulsion of cetyl isooctanoate (containing 50% of oily material) | 10.0 |
| | Emulsion of glyceryl tri(caprilate/caprate) (containing 50% of oily material) | 10.0 |
| Thixotropic agent | Ammonium polyacrylate | 1.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 11

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Ammonium polyacrylate | 1.5 |
| Surfactant | Sodium dioctylsulfosuccinate | 1.0 |
| | Fluorine-containing surfactant (Surflon S141 available from Seimi Chemical K.K.) | 0.2 |
| Stabilizing agent | α-cyclodextrin | 1.2 |
| Antiseptic | Proxel XL-2 (available from Avecia K.K.) | 0.5 |

Example 12

| | | |
|---|---|---|
| Pigment dispersion | Black pigment dispersion[1] | 35.0 |
| Separating agent | Emulsion of cetyl isooctanoate (containing 50% of oily material) | 20.0 |

-continued

| | | |
|---|---|---|
| Thixotropic agent | Ammonium polyacrylate | 1.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Example 13

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Ammonium polyacrylate | 0.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 7

| | | |
|---|---|---|
| Pigment dispersion | Black pigment dispersion[1] | 35.0 |
| Separating agent | Emulsion of cetyl isooctanoate (containing 50% of oily material) | 20.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 8

| | | |
|---|---|---|
| Pigment dispersion | Red pigment dispersion[2] | 35.0 |
| Separating agent | Emulsion of cetyl isooctanoate (containing 50% of oily material) | 20.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 9

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Ammonium polyacrylate | 4.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 10

| | | |
|---|---|---|
| Pigment dispersion | Red pigment dispersion[2] | 35.0 |
| Separating agent | Emulsion of cetyl isooctanoate (containing 50% of oily material) | 20.0 |
| Thixotropic agent | Ammonium polyacrylate | 4.0 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Reference Example 11

| | | |
|---|---|---|
| Pigment dispersion | Black pigment dispersion[1] | 35.0 |
| Separating agent | Emulsion of cetyl isooctanoate (containing 50% of oily material) | 20.0 |
| Thixotropic agent | Xanthan gum | 0.5 |
| Surfactant | Sodium dioctylsulfosuccinate | 1.0 |
| | Fluorine-containing surfactant (Surflon S141 available from Seimi Chemical K.K.) | 0.2 |
| Antiseptic | Proxel XL-2 (available from Avecia K.K.) | 0.5 |

Note 1) Water Base Pigment Dispersion Used:
1) Carbon black (Special Black 100 available from Degussa) and aqueous solution (of solid content of 15% by weight) of polyvinyl alcohol resin (Kuraray Poval PVA-403 having a saponification degree of 78.5-81.5 mol % and a viscosity of 2.8-3.3 mPa·s at 20° C. as measured with respect to 4% concentration aqueous solution of the resin, available from Kuraray K.K.) were placed in a vessel in a weight ratio of 3:10, and then isopropanol (wetting agent) was added in an amount of 0.2 parts by weight in relation to one part by weight of the pigment. The resulting mixture was stirred and then it was subjected to treatment with a beads mill to disperse the pigment in the water as finely divided particles of average particle size of 0.2 μm to provide a dispersion. Then, water was added to the dispersion so that the resulting water base black pigment dispersion contained the pigment in an amount of 11.5% by weight and the polyvinyl alcohol resin in an amount of 5.8% by weight.

2) Water base red pigment dispersion was prepared in the same manner as the black pigment dispersion[1] as mentioned above except that red pigment (Novoperm Red GLF available from Clariant Japan K.K.) was used in place of the carbon black.

Note 2) Thixotropic Agent Used:
1) Ammonium polyacrylate, MOWIPLAS XW-330 available from Clariant Japan K.K.
2) Urethane modified polyol, Adekanol UH-752 available from Asahi Denka Kogyo K.K.
3) Xanthan gum, Kerzan available from K.K. Sansho.

The ink compositions of Examples 6-13 and Reference Examples 7-11 were each charged in an inside wick composed of bundles of threads having a density 0.185 g/cm$^3$ and the inside wick was placed in a marking pen provided with a pen tip made of polyester fiber felt tip. The tests were carried out as below mentioned and the results are shown in Table 2.

Storability of Ink Composition:

After the marking pen was left standing with the pen tip either upward, downward or horizontally at a temperature of 50° C. for a period of one month, markings were formed on a white board using the marking pen, and the darkness of resulting markings was compared with the markings marked with the marking pen before it was left standing to evaluate the storability of the ink composition. "A" means that there was no difference in the darkness of the markings before and after standing; "B" means that there was difference to a degree in the darkness of the markings before and after standing; and "C" means that there was remarkable difference in the darkness of the markings before and after standing.

Erasability of Writings:

After markings were formed on a white board at a temperature of 20° C. and at a relative humidity of 65% and the markings were dried, they were wiped with an eraser made of polyester cloth under a load of 100 gf to evaluate the erasability of the ink composition. "A" means that the markings were completely erased; "B" means that only part was erased and stain was left on the white board.

Viscosity Measurement Under Stress:

The viscosity was measured at a temperature of 20° C. in terms of CS-flow curve using a DG41AL rotor using a viscometer RS75 (rheometer) manufactured by Haake.

Viscosity Measurement Using E-Type Rotational Viscometer:

Using an E-type rotational viscometer (cone-disk rheometer) ELD manufactured by Tokimeck, the viscosity was measured at a shear rate D of 10 s$^{-1}$, i.e., the shear viscosity was measured using an R24 corn having an angle of 1° 34' between the cone and the disk with the disk turned at a rate of 2.5 rpm at a temperature of 20° C. The viscosity was also measured at a shear rate D of 200 s$^{-1}$, i.e., the shear viscosity was measured using an R24 corn having an angle of 1° 34' between the cone and the disk with the disk turned at a rate of 50 rpm at a temperature of 20° C.

Letter Recognition:

A letter was written on a white board using the marking pen, and the letter was watched head on and from sidelong at an angle of 45° to evaluate the letter recognition on the board. "A" means that the letter was equally clearly recognized in both cases; and "B" means that the letter was recognized only unclearly.

As shown in Examples, the ink composition that has a viscosity of not less than 45 mPa·s under a stress of 0.01 Pa and a viscosity of not more than 12 mPa·s under a stress of 10 Pa at a temperature of 20° C. does not sediments in the inside wick, and in addition, it provides writings in which no color separation takes place if time passes. Furthermore, the writings formed with the ink composition on a white board is readily erased and can be recognized clearly from head on or from sidelong.

In contrast, as shown in Reference Examples, if the ink composition having almost the same viscosity as that of Examples as measured using an E-type rotational viscometer has a viscosity under a stress of 0.01 Pa or 10 Pa outside the range defined according to the invention, it sediments in the inside wick and provides writings in which color separation takes place when time passes. The writing formed on a white board is inferior not only in erasability but also in recognition when seen from sidelong.

TABLE 2

| Properties of Ink composition | Examples | | | | | | | | Reference Examples | | | | |
|---|---|---|---|---|---|---|---|---|---|---|---|---|---|
| | 6 | 7 | 8 | 9 | 10 | 11 | 12 | 13 | 7 | 8 | 9 | 10 | 11 |
| Storability | A | A | A | A | A | A | A | B | C | C | A | A | B |
| Erasability | A | A | A | A | A | A | A | A | A | A | B | B | B |
| Viscosity under a stress of 0.01 Pa | 360 | 360 | 350 | 370 | 360 | 360 | 280 | 180 | 40 | 40 | 950 | 950 | 200 |
| Viscosity under a stress of 10 Pa | 10 | 10 | 10 | 10 | 10 | 10 | 8 | 6 | 7 | 7 | 18 | 18 | 8 |
| Viscosity under a shear of 10 s$^{-1}$ | 20 | 20 | 19 | 20 | 20 | 20 | 15 | 10 | 12 | 12 | 35 | 35 | 12 |
| Viscosity under a shear of 200 s$^{-1}$ | 11 | 11 | 11 | 11 | 11 | 11 | 9 | 7 | 10 | 10 | nm | nm | 9 |
| Letter recognition | A | A | A | A | A | A | A | B | B | B | A | A | B | nm = not measurable

What is claimed is:

1. A water base erasable ink composition for use in marking pens which comprises 0.05-20% by weight of a colorant, and 1-20% by weight of an oily material which is nonvolatile at normal temperatures (25° C.);

a) wherein the colorant is dispersed in the water with the aid of a polyvinyl alcohol resin as a dispersing agent which has a saponification degree of 70-85 mol % and of which an aqueous solution of 4% concentration has a viscosity of 2-30 mPa·s at 20° C.; and an aliphatic lower alcohol of number of carbon atoms of 2 to 4 as a wetting agent for the colorant in an amount of 0.1-2 parts by weight in relation to one part by weight of the colorant, in a weight ratio of the resin to the colorant of 0.5 to 5 and in an amount of 1 to 10% by weight based on the ink composition to form a dispersion of colorant; and then b) an O/W emulsion of oily material prepared with the aid of a non-ionic surfactant as an emulsifier in an amount of 1-20% by weight based on the emulsion and having a viscosity of 5-40 mPa·s at 20° C. is added to the dispersion of colorant.

2. The water base erasable ink composition for use in marking pens as claimed in claim 1 wherein the oily material is at least one selected from the group consisting of aliphatic carboxylic acid esters, higher hydrocarbons and higher alcohols.

3. The water base erasable ink composition for use in marking pens as claimed in claim 1 which further comprises 1-10% by weight of cyclodextrins as a stabilizing agent for the emulsion of the oily material.

4. The water base erasable ink composition for use in marking pens as claimed in claim 1 wherein the aliphatic lower alcohol is ethanol, propanol or butanol.

5. The water base erasable ink composition for use in marking pens as claimed in claim 1 which further comprises a thixotropic agent so that the ink composition has a viscosity of not less than 45 mPa·s under a stress of 0.01 Pa and a viscosity of not more than 12 mPa·s under a stress of 10 Pa at a temperature 20° C.

6. The water base erasable ink composition for use in marking pens as claimed in claim 5 wherein the colorant is dispersed in the water with the aid of a polyvinyl alcohol resin as a dispersing agent in a weight ratio of the resin to the colorant of 0.5 to 3.

7. The water base erasable ink composition for use in marking pens as claimed in claim 5 wherein the thixotropic agent is at least one water-soluble resin selected from the group consisting of polyacrylic acid, polyacrylic acid alkali metal salts, polyacrylic acid organic amine salts, styrene-acrylic acid copolymer, styrene-maleic acid copolymer, carboxymethyl-cellulose, poly(N-vinyl acetamide), polyols and polyethers.

8. The water base erasable ink composition for use in marking pens as claimed in claim 1, wherein water is added to the dispersion of colorant before the addition of the O/W emulsion.

* * * * *